2,847,431
OXIDATION OF ETHYLENICALLY UNSATU-
RATED FATTY ACIDS

Chester S. Morgan and James W. Walker, Corpus Christi,
Tex., assignors to Celanese Corporation of America,
New York, N. Y., a corporation of Delaware No Drawing. Application February 7, 1955
Serial No. 486,677

9 Claims. (Cl. 260—406)

This invention relates to oxidation reactions and relates more particularly to the oxidative scission of unsaturated higher fatty acids.

The oxidative scission of higher fatty acids to split the aliphatic chain at its point of unsaturation and to produce monobasic and dibasic acids is well known to the art. Thus, oleic acid has been oxidized to form a mixture of acids including pelargonic and azelaic acids. However, the yields of such acids obtained by the methods of the prior art have not been as high as desired and the recovery of the oxidation products from the reaction mixtures has been difficult.

It is therefore an object of this invention to provide a novel process for the oxidation of unsaturated higher fatty acids to produce relatively high yields of easily recoverable acids.

Another object of this invention is the provision of a new and improved process for the oxidation of oleic acid.

Other objects of this invention will be apparent from the following detailed description and claims.

In accordance with this invention an ethylenically unsaturated higher fatty acid is oxidized in a two-stage process in which the higher fatty acid is first reacted with a gas containing molecular oxygen, preferably air, and the intermediate oxidation products thus obtained are then further oxidized by reacting them with nitric acid.

The ethylenically unsaturated higher fatty acid employed in the practice of this invention preferably contains 16 to 24 carbon atoms and contains no ethylenic linkages which are conjugated with the carbonyl group of the carboxylic acid radical. Examples of acids falling within this class are oleic acid, with which the process of this invention is especially useful, palmitoleic, petroselinic, erucic, linolenic and linoleic acids. The acid may be supplied to the process in commercially pure form, or materials containing such acid, e. g. foots oil or mixtures of fatty acids obtained from tall oil, may be oxidized directly without first separating the acid therefrom.

The first stage of the oxidation of the unsaturated higher fatty acid is carried out conveniently by passing air or, if desired, other gas which contains molecular oxygen, through a solution of said higher fatty acid in an appropriate solvent. Acetic acid is a preferred solvent for this purpose. Other solvents which may be employed are propanol, benzene, propionic acid, esters, other hydrocarbons and other acids. Preferably there is also present an oxidation catalyst such as, for example, a metallic catalyst containing cobalt, manganese, copper or chromium. Especially valuable results are obtained when a cobalt salt which is soluble in the reaction mixture, such as cobalt acetate or cobalt naphthenate, is used since it exhibits a high catalytic activity and retains this activity substantially unchanged for long periods of time. For best results, the concentration of cobalt is in the range of about 50 to 500 parts per million. The rate of reaction increases as the proportion of catalyst is increased, until the concentration of cobalt in the reaction mixture is raised above about 100 parts per million, when no further increase in reaction rate is observed. Accordingly, from the standpoint of economy it is preferable to use at most about 100 parts per million of cobalt.

In addition to, or in place of, the aforementioned catalysts there may also be present an oxidation initiator or promoter, such as acetaldehyde. The use of acetaldehyde for this purpose is especially desirable when acetic acid is employed as the solvent, since the acetaldehyde is itself converted to acetic acid during the oxidation. Suitable concentrations of acetaldehyde in the mixture undergoing oxidation are, for example, 25 to 200% by weight, based on the weight of oleic acid.

While some oxidation of the oleic acid or other unsaturated higher fatty acid to desired products will take place over a fairly wide range of temperatures, for example, temperatures from about 25 to 150° C., it is preferred to operate within a more limited range of temperatures. At temperatures above about 90° C. considerable quantities of unwanted carbonyl compounds are produced and the tendency for the oleic acid to polymerize is increased. At temperatures below about 80° C., and in the absence of an oxidation promoter, the reaction becomes relatively sluggish and time consuming when commercially pure oleic acid is employed. However, when an oxidation promoter, e. g. acetaldehyde, is present the oxidation reaction takes place rapidly even at temperatures considerably below 80° C. Also, when a mixture of oleic acid and appreciable amounts of linoleic acid is employed the reaction takes place at a practical rate at temperatures below 80° C., e. g. 60° C.

Advantageously, the first oxidation reaction, employing air or other oxygen-containing gas, is carried out until the unsaturation of the material being oxidized has decreased by 70 to 100%, preferably by about 90 to 97%, as determined by decrease in the iodine number of the mixture.

The mixture of intermediate products produced by the first oxidation reaction is, advantageously, not separated into one or more of its individual components before the oxidation with nitric acid. It is desirable, however, to remove at least a major part of the solvent from the mixture, as by evaporation, before this second oxidation reaction takes place.

In one convenient method the second oxidation reaction is carried out by slowly passing the crude mixture of intermediate oxidation products, freed of most of their solvent content, into a vigorously agitated bath of nitric acid. It is desirable for optimum results to employ aqueous nitric acid containing 40 to 85%, preferably 65 to 70%, $HNO_3$ and to maintain the temperature of the nitric acid relatively low, e. g. 30 to 35° C., while the intermediate oxidation products are added thereto and then to allow the temperature of the nitric acid mixture to rise slowly, e. g. to 95° C., with application of heat if necessary. Presumably, easily oxidized functional groups of the intermediate oxidation products react at the lower temperatures and the more resistant groups at the higher temperature. In this manner any degradation of the dibasic acids due to the action of the nitric acid at high temperature is minimized. During the reaction nitric acid is converted to nitric oxide, NO, which can be recovered, as by evaporation from the reaction mixture. This nitric oxide can be oxidized to nitric acid by contact with air followed by solution in water, and the resulting nitric acid may be recycled to react with more of the intermediate reaction products of the oxidation of the unsaturated fatty acid. Alternatively, if desired, air may be injected into the mixture of nitric acid and intermediate oxidation products while the reaction between these materials is taking place, in order to regenerate in situ the nitric acid which is used up.

The reaction product from the nitric acid treatment forms two layers. The upper, non-aqueous layer contains most of the monocarboxylic acid present in the reaction products, while the aqueous layer contains the nitric acid and the dicarboxylic acids. By chilling the aqueous layer to cause the crystallization of dicarboxylic acids, a considerable portion of such acids may be recovered.

In one convenient process for recovering the mono- and dicarboxylic acids from the nitric acid reaction mixture, the lower aqueous layer is extracted with a hydrocarbon such as cyclohexane or n-heptane to remove any residual monocarboxylic acids present therein, and the resulting hydrocarbon extract, together with the upper non-aqueous layer, is fractionally distilled to recover the desired monocarboxylic acid or acids as a distillate. Before such fractional distillation, the upper layer and the hydrocarbon extract may be extracted with water, preferably hot water, to assure removal of dicarboxylic acids, and the resulting aqueous extract may be combined with the lower aqueous layer. This lower layer is then cooled to cause the formation of crystals of dicarboxylic acids therein. The crystals are filtered from the mother liquor, which is then concentrated by evaporation, preferably at subatmospheric pressure, to remove most of its nitric acid and water. Thereafter, the concentrated mother liquor is chilled to cause the crystallization of further quantities of dicarboxylic acids.

By the process of this invention a more complete oxidation of the unsaturated fatty acid to the desired monocarboxylic and dicarboxylic acids is obtained. Thus, the use of this process for the oxidation of oleic acid results in a marked improvement in the yields of azelaic and pelargonic acids. In addition, it is not necessary to separate and purify any intermediate oxidation products, and the final reacted mixture is of such a nature that the recovery of the monocarboxylic and dicarboxylic acids therefrom is relatively simple and economical.

The following examples are given to illustrate the invention further. All proportions are by weight unless otherwise indicated.

*Example I*

300 parts of impure oleic acid, having an acid number of 194 and an iodine number of 85, 700 parts of acetic acid, 1 part of cobalt acetate and 200 parts of acetaldehyde are charged to a cylindrical stainless steel tube. Air is bubbled through the solution in the tube at a rate of about 47 parts/hr. for 16 hours while the pressure in the tube is maintained at 65 pounds per square inch gauge and the temperature at 54° C. Analysis of the vent gases shows an oxygen content of 1 to 3 mol percent. During the oxidation an additional 232 parts of acetaldehyde are added, periodically in equal portions at uniform intervals of 4 hours. At the end of the 16 hour period the iodine number of the mixture has been reduced by about 96%; i. e. it is 4% of its original value.

The resulting reaction mixture is then heated at a temperature of 70° C., and at a pressure of 10–20 mm. Hg absolute, to evaporate about 95% of its acetic acid, and is then added slowly, over a period of about 2 hours, to 1000 parts of vigorously stirred aqueous nitric acid of 70% initial concentration. During this addition the temperature is maintained at 30 to 35° C. The temperature is thereafter allowed to rise slowly to a peak of 95° C. The resulting mixture forms two layers. Four hours after the beginning of the slow addition these two layers are separated. The upper layer contains pelargonic acid, unreacted stearic acid, present as an impurity in the oleic acid feedstock, and a small amount of esters not oxidized by the nitric acid. The lower layer is extracted with 0.5 times its weight of cyclohexane, the cyclohexane extract is combined with the upper layer and the resulting mixture is extracted with an equal amount, by weight, of hot water having a temperature of about 70° C. to remove dicarboxylic acids. The water-extracted mixture is then fractionally distilled to recover 66 parts of pelargonic acid, representing a yield of 40% calculated as if the feedstock were 100% pure oleic acid. The water-extract is combined with the aqueous lower layer and the resulting mixture is chilled to a temperature of 0° C. to cause the formation of crystals of azelaic acid. After recovery of the crystals by filtration, the mother liquor is heated to a temperature of 70° C. under a pressure of 25 mm. Hg absolute to evaporate off about 80% of its weight, mainly as nitric acid and water. The residue of the evaporation is a viscous liquid which forms crystals of dicarboxylic acid on standing. The crystals are removed by filtration and washed with ether, while the dicarboxylic acids in the mother liquor remaining after this filtration are recovered by esterifying them with methyl alcohol. The total yield of dicarboxylic acids of 6 to 9 carbon atoms, primarily azelaic acid and suberic acid, is 183 parts, representing a yield of 91.9%, calculated as if the feedstock were 100% pure oleic acid.

*Example II*

Example I is repeated except that a mixture of about 50% oleic acid, 48% linoleic acid and 2% saturated acids, derived from tall oil and sold under the name "Acintol FA–2" is used as the feedstock in place of the impure oleic acid of Example I, the ratio of the weight of acetaldehyde to the weight of feedstock is 1.7:1 rather than about 1.4:1, the air oxidation is carried out for 24 hours, and the peak temperature during the reaction with nitric acid is 90° C. 0.17 part of pelargonic acid are obtained per part of feedstock, representing a yield of 60%, calculated on the basis of the oleic acid content of the feedstock. 0.62 part of dibasic acids of 6 to 9 carbon atoms, primarily azelaic acid and suberic acid, are obtained per part of feedstock, representing a yield of 94% calculated as if the feedstock were 100% pure oleic acid. The caproic acid produced by the oxidation of the linoleic acid is not recovered.

*Example III*

300 parts of Acintol FA–2, 700 parts of acetic acid and 0.5 part of cobalt acetate are charged to a cylindrical glass reactor, and air, at atmospheric pressure, is passed through the solution at a rate of about 14 parts per hour. There is no induction period. The oxidation is carried out at 60° C. After about 20 hours the reaction rate slowly declines as evidenced by the oxygen content of the vent gases, and the reaction temperature is slowly increased to 80° C. before termination of the run. The total oxidation time is 72 hours.

The resulting reaction mixture is then treated, in the same manner as the air-oxidation product of Example I, to further oxidize it with nitric acid and to separate the reaction products. The yield of pelargonic acid is 61%, calculated on the basis of the oleic acid content of the feedstock, while the yield of dibasic acids of 6 to 9 carbon atoms is 95.8%, calculated as if the feedstock were 100% pure oleic acid.

*Example IV*

340 parts of crude tall oil containing 50.7% of unsaturated fatty acids, 800 parts of acetic acid, 200 parts of acetaldehyde and 1.0 part of cobalt acetate are charged to a cylindrical stainless steel reactor and air passed through the solution. The pressure is maintained at 65 p. s. i. g. and the temperature at 74° C. 275 parts of acetaldehyde are added during the run.

The oxidation with air is carried out for 20 hours and thereafter the reaction mixture is treated, in the same manner as the air-oxidation product of Example I, to further oxidize it with nitric acid and to separate the reaction products. The yield of dibasic acids of 6 to 9 carbon atoms is 96.0%, based on the unsaturated fatty acid content of the tall oil employed and calculated as if this unsaturated fatty acid content were all oleic acid.

It is to be understood that the foregoing detailed description is merely given by way of illustration and that many variations may be made therein without departing from the spirit of our invention.

Having described our invention, what we desire to secure by Letters Patent is:

1. Process for the oxidative scission of oleic acid, which comprises partially oxidizing an oleic acid-containing feedstock by passing air through a solution of said feedstock in a solvent comprising acetic acid and containing a metallic catalyst for the oxidation of oleic acid with oxygen, separating a major portion of said solvent from the mixture resulting from said partial oxidation and further oxidizing said mixture with aqueous nitric acid to produce a product having a non-aqueous phase wherein pelargonic acid is concentrated and an aqueous phase wherein azelaic acid is concentrated.

2. Process as set forth in claim 1 in which the catalyst is a cobalt catalyst, the oxidation with air is continued until the iodine number of the reaction mixture is reduced by at least about 70%, and the $HNO_3$ concentration of the aqueous nitric acid is about 40 to 85%.

3. Process as set forth in claim 2 in which said $HNO_3$ concentration is 65-70%.

4. Process as set forth in claim 2 in which the solution being oxidized with air contains acetaldehyde.

5. Process as set forth in claim 2 in which the treatment with aqueous nitric acid is carried out by gradually adding the mixture to a bath of said aqueous nitric acid maintained at a temperature up to about 35° C. and thereafter raising the temperature.

6. Process for the oxidative scission of unsaturated acids, which comprises partially oxidizing an ethylenically unsaturated higher fatty acid containing 16 to 24 carbon atoms by passing oxygen through a solution of said acid in a solvent which does not interfere with said partial oxidation and containing a metallic catalyst for the oxidation of said acid with oxygen, separating a major portion of said solvent from the mixture resulting from said partial oxidation and then further oxidizing said mixture with aqueous nitric acid to produce a mixture of monocarboxylic and dicarboxylic acids of shorter chain length than said unsaturated fatty acid.

7. Process as set forth in claim 6 in which the oxygen is supplied as air.

8. Process as set forth in claim 6 in which the oxidation with oxygen is continued until the iodine number of the reaction mixture is reduced by at least about 70%.

9. Process as set forth in claim 6 in which said aqueous nitric acid contains 65 to 70% $HNO_3$.

References Cited in the file of this patent

UNITED STATES PATENTS

| | | |
|---|---|---|
| 2,203,680 | Ellingboe | June 11, 1940 |
| 2,292,950 | Loder et al. | Aug. 11, 1942 |
| 2,439,513 | Hamblet et al. | Apr. 13, 1948 |
| 2,572,892 | Severn et al. | Oct. 30, 1951 |